Oct. 21, 1958 G. T. BRANCH 2,856,979
PNEUMATIC TIRE TRACTION AID
Filed Sept. 19, 1956 2 Sheets-Sheet 1

INVENTOR
Gilbert T. Branch,
BY
ATTORNEY

Oct. 21, 1958     G. T. BRANCH     2,856,979
PNEUMATIC TIRE TRACTION AID

Filed Sept. 19, 1956     2 Sheets-Sheet 2

Gilbert T. Branch
INVENTOR.

BY Loyal J. Miller
ATTORNEY

United States Patent Office 2,856,979
Patented Oct. 21, 1958

2,856,979

PNEUMATIC TIRE TRACTION AID

Gilbert T. Branch, Oklahoma City, Okla.

Application September 19, 1956, Serial No. 610,827

6 Claims. (Cl. 152—174)

The present invention relates to anti-skid or traction-aid devices particularly for use with pneumatic tires.

The most common type of pneumatic tire traction-aid comprises metallic chains adapted to envelop the tread and a portion of the adjacent side wall of the inflated tire. This type of traction-aid is satisfactory when used on snow covered hard surfaced roads or on muddy dirt roads. However, when used on roads which are alternately snow covered or muddy and dry, the cross links of the chains create considerable noise and tend to wear rapidly when driving over the dry sections of road. Chains are expensive to manufacture and have a comparatively short life, resulting in a considerable item of expense to the motorist who must necessarily use some anti-skid device during bad weather.

The prior art reveals a number of anti-skid devices formed, for the most part at least, of discarded tire casings. However, in order to adapt the old casing to envelop a tire, the old casings are usually cut or slotted transversely of the tread and side wall portions, thus severing the reinforcing cords and thereby rendering the remaining transverse portions or sections limber or unsupported, resulting in the same being less effective as a traction-aid, and more easily torn loose from the remaining supporting side wall or bead of the old casing.

It is therefore the principal object of this invention to provide a device which may be removably connected to pneumatic tires at the beginning of bad weather, and which may be continuously used thereon during the bad weather and throughout the periods of good weather between storms when the roads are dry, without subjecting the device to any more appreciable wear than the tire itself would encounter.

A similarly important object is to provide a device of this class which will provide additional traction for pneumatic tires in mud, snow, ice, or sand.

An additionally important object is to provide a device of this class which is reinforced throughout its tread and side wall portions in such a manner that the side wall portions of the device will not be subjected to an undue amount of strain during operation.

Another object is to provide a device of this class which is silent in operation when driving on dry roads, in contradistinction to conventional chains or the like.

Another object is to provide a traction-aid of this character which is as resistant to sidewise slippage or skidding as the tire itself.

A further object is to provide a device of this class which will not cut or injure the tire on which it is mounted.

Still another object is to provide a device of this class which is easy and inexpensive to manufacture, and which will add to the life of the tire on which it is mounted.

Yet another object is to provide a device of this character which is durable, regardless of the type of road surface over which it is driven.

The present invention accomplishes these and other objects by providing a strip or split shoe of reinforced resilient material, preferably rubber, arcuate in cross section, and adapted to envelop the tread and adjacent side portions of the tire.

A plurality of rectangular transversely disposed circumferentially spaced-apart openings in the tread portion of the shoe permit contact of the tire tread with the road surface therethrough. The imperforate sections of the tread portion of the shoe integrally carry a plurality of transversely disposed raised ribs which provide additional traction. The ends of the shoe are adjustably connected together on opposing sides of the tire to maintain the device in place.

Other objects will be apparent from the following description when taken in conjunction with the accompanying two sheets of drawings, wherein.

Like characters of reference designate like parts in those figures of the drawings in which they occur.

In the drawings.

Figure 1:
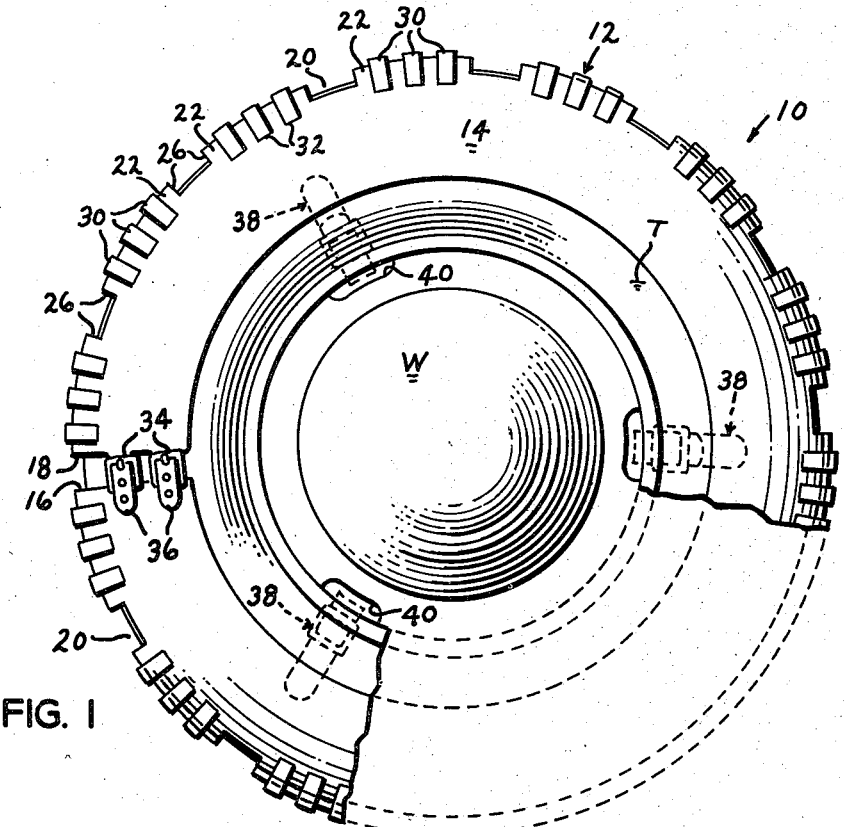
Figure 1 is a side elevational view of an automobile wheel and tire with the device installed thereon, and illustrating, in dotted lines, auxiliary means for fastening the device to the wheel and tire.
Figure 2:
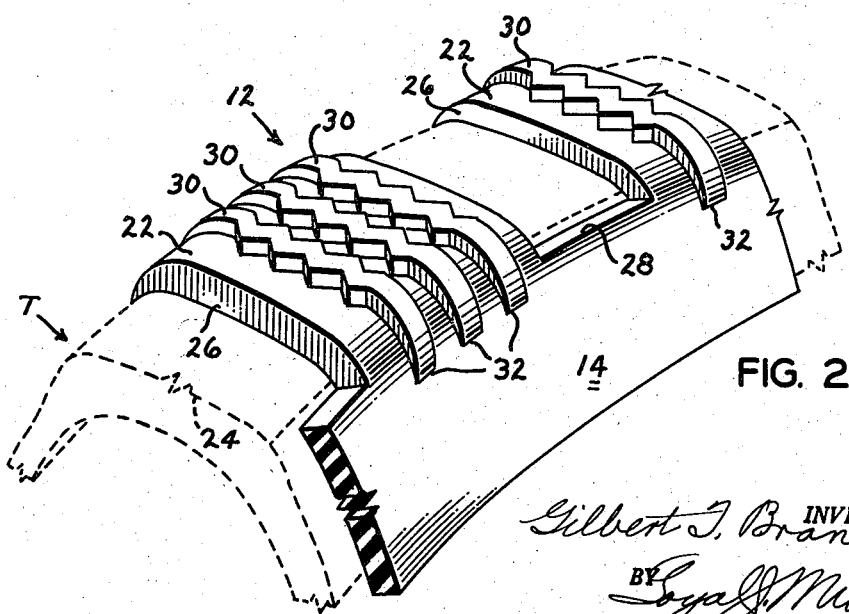
Figure 2 is a fragmentary perspective view of the device in operating position, a fragment of the tire being shown in dotted lines.

The reference numeral 10 indicates, as a whole, the device in operating position on a pneumatic tire T mounted on a wheel W. The device 10 comprises a split shoe or strip of resilient material, preferably rubber, arcuate in cross section and having a tread portion 12 and side walls 14. Transversely the tread portion 12 is substantially equal with relation to the tread of the tire T. The transverse width of the side walls 14 is preferably such that they envelop substantially one-half of the side walls of the tire T. The length of the shoe or strip 10 is such that the ends 16 and 18 are disposed in comparatively close spaced-apart relation when the shoe is installed around the periphery of the tire T (Fig. 1).

The tread 12 of the shoe 10 is provided with a series of rectangular slots or openings 20 symmetrically arranged in circumferentially equally spaced-apart relation defining a series of imperforate shoe tread sections 22 therebetween. The openings 20 and imperforate tread sections 22 are shown in exaggerated size in the drawings for clarity. The circumferential width of each of the openings 20 is preferably approximately one inch and the length thereof transversely of the shoe tread is sufficient to expose the full width of the tire tread 24. The side walls 26 defining the circumferential width of the openings 20 are perpendicular to the outwardly disposed surface sections 22. Similarly, the end walls 28 defining the length of the openings 20 transversely of the shoe tread are perpendicular to the respective side wall portions 14.

The tread 12 of the shoe comprises a plurality, preferably three, transversely disposed integral raised ribs 30 centrally located in circumferentially equally spaced-apart relation on each of the imperforate sections 22. Cross sectionally the ribs 30 are preferably rectangular and are formed in a co-operative zigzag pattern as an aid for preventing sidewise slippage or skidding of the tire. Each respective end of the ribs 30 converge into the plane of the side walls 14, as at 32, on each side of the tread portion 12. The thickness of the imperforate sections 22 may be varied, as desired, for the particular sized tire upon which it is intended for use, but is preferably at least one-half inch in thickness. The ribs 30 extend perpendicularly outwardly from the surface of the sections 22 approximately one-eighth inch. Thus, the shoe tread 12 enlarges the radius of the tire T only five-eighths of an inch and, since the openings 20 between the sections 22 are relatively narrow, at least two of the tread sections 22 will be in contact with the road surface, not shown, at all times. Further, the weight or mass of the vehicle tends to compress the resilient material of the shoe and permits some contact of the tread 24 of the tire T through the openings 20. The perpendicular walls 26 of the openings and the sides of the raised ribs 30 form gripping shoulders and provide traction for the tire. It seems obvious that, since the openings 20 extend transversely only the width of the tire tread 24, leaving the entire width of each side wall 14 imperforate, rough usage of the device will not tend to tear the tread 12 loose from the side walls, which is experienced when the openings are extended transversely along each of the side walls 14.

A pair of buckles 34 are connected to each respective side wall 14 adjacent the end 16 of the shoe. The side walls 14 are each extended to provide a pair of perforated straps 36 in co-operative alignment with the buckles 34 for adjustably fastening the shoe on the tire T. As a further aid in positioning the shoe on the tire, additional straps and buckles 38 may be connected to the opposing inward edges of the side walls 14 and passed through openings 40 in the wheel W. These straps 38 will then prevent circumferential rotation of the shoe 10 with relation to the tire T in the event that the shoe becomes loose on the tire. Obviously, the tire T may be deflated slightly while installing the shoe and then reinflated to insure a tight fit of the shoe.

Figure 3:
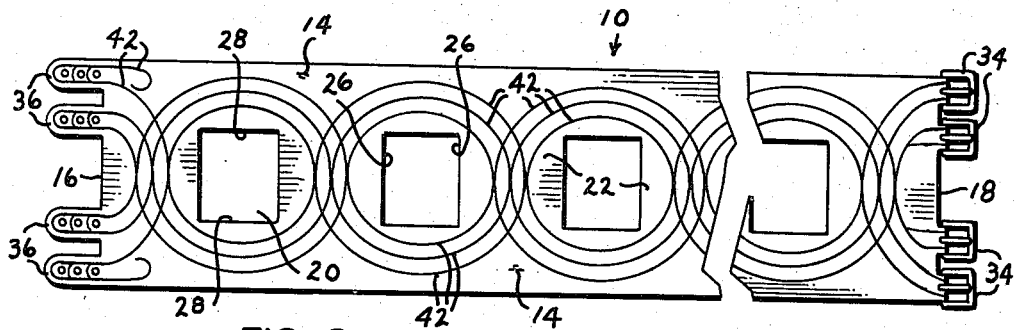
Figure 3 is a fragmentary plan view of the device diagrammatically illustrating the path of the reinforcing means.
Figure 4:
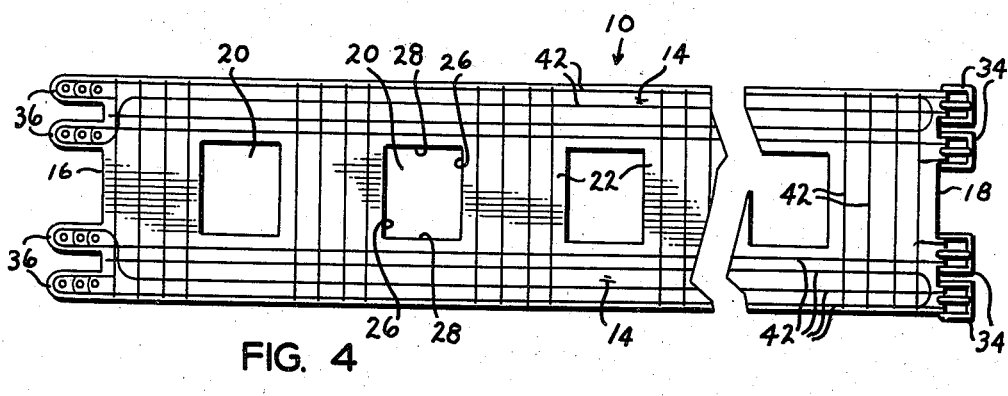
Figure 4 is a view similar to Fig. 3, illustrating alternate reinforcing means.

The plan views of Figs. 3 and 4 diagrammatically illustrate how nylon cords or wires 42 may be entwined or interwoven around and across the sections 22 and along the side walls 14 then the shoe is formed. This manner of reinforcing the shoe has the advantage of providing reinforcing means at the points of greatest stress, and precludes tearing or ripping of the shoe while in use. These reinforcing wires 42 further aid in reinforcing the eyes or perforations in the straps 36, and in securing the buckles to the side walls 14.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A traction-aid for use with a pneumatic tire mounted on a wheel, including: a split shoe of reinforced resilient material arcuate in cross section, adapted to envelop the tread portion and an adjacent portion of the side walls of said tire, said shoe having side walls overlapping a portion of the side walls of said tire and having a plurality of circumferential equally spaced-apart relatively narrow transverse rectangular openings in its tread portion only for exposing the tread of said tire and permitting contact of the same with a supporting surface; strap and buckle means connected to the side walls of said shoe on opposite sides of the split for releasably connecting the ends of said shoe; and a plurality of circumferentially spaced-apart substantially parallel upstanding ribs transversely carried integrally by the tread portion of said shoe between said openings.

2. A traction-aid for use with a pneutmatic tire, including: a split shoe of resilient material arcuate in cross section forming a tread portion and side wall portions, adapted to envelop the tread portion and an adjacent portion of the side walls of said tire, said shoe having side walls overlapping a portion of the side walls of said tire and having a plurality of circumferential equally spaced-apart transversely disposed relatively narrow rectangular openings in its tread portion for exposing a portion of the tread portion of said tire and permitting contact of the same with a suporting surface; reinforcing means imbedded in the material of said shoe around the openings therein; strap and buckle means connected to the side walls of said shoe on opposite sides of the split for releasably connecting the ends of said shoe; and a plurality of circumferentially spaced-apart raised substantially parallel ribs transversely carried integrally by each of the tread portions of said shoe between said openings.

3. Structure as specified in claim 1, in which the circumferential width of imperforate portions of the tread of said shoe are substantially greater than the circumferential width of said openings therebetween.

4. Structure as specified in claim 3, in which the ribs extend the full distance across the tread of said shoe.

5. Structure as specified in claim 3, and a plurality of pairs of straps co-operatively connected to each of the respective side portions of said shoe and extended through the wheel for removably connecting said shoe to said tire.

6. Structure as specified in claim 2, in which the ribs extend the full distance across the tread of said shoe.

References Cited in the file of this patent

UNITED STATES PATENTS

| | | |
|---|---|---|
| 2,079,235 | Wettlaufer | May 4, 1937 |
| 2,608,232 | Kennedy | Aug. 26, 1952 |